United States Patent
Fang et al.

(10) Patent No.: US 11,126,276 B2
(45) Date of Patent: Sep. 21, 2021

(54) METHOD, DEVICE AND EQUIPMENT FOR LAUNCHING AN APPLICATION

(71) Applicant: Beijing Bytedance Network Technology Co., Ltd., Beijing (CN)

(72) Inventors: Chi Fang, Beijing (CN); Wei Lu, Beijing (CN); Huayun Miao, Beijing (CN)

(73) Assignee: Beijing Bytedance Network Technology Co., Ltd., Beijing (CN)

( * ) Notice: Subject to any disclaimer, the term of this patent is extended or adjusted under 35 U.S.C. 154(b) by 0 days.

(21) Appl. No.: 17/018,191

(22) Filed: Sep. 11, 2020

(65) Prior Publication Data

US 2020/0409479 A1    Dec. 31, 2020

Related U.S. Application Data

(63) Continuation of application No. PCT/CN2019/088645, filed on May 27, 2019.

(30) Foreign Application Priority Data

Jun. 21, 2018   (CN) .......................... 201810645574.2

(51) Int. Cl.
*G06F 3/0346* (2013.01)
*G06F 9/48* (2006.01)

(52) U.S. Cl.
CPC ............ *G06F 3/0346* (2013.01); *G06F 9/485* (2013.01)

(58) Field of Classification Search
CPC ............................... G06F 3/0346; G06F 9/485
See application file for complete search history.

(56) References Cited

U.S. PATENT DOCUMENTS 8,228,292 B1   7/2012   Ruiz et al.
9,063,574 B1   6/2015   Ivanchenko
(Continued)

FOREIGN PATENT DOCUMENTS

CN   102662586 A   9/2012
CN   103885685 A   6/2014
(Continued)

OTHER PUBLICATIONS

International Patent Application No. PCT/CN2019/088645; Int'l Search Report; dated Sep. 2, 2019; 3 pages.
(Continued)

*Primary Examiner* — Shourjo Dasgupta
(74) *Attorney, Agent, or Firm* — BakerHostetler (57) ABSTRACT

The disclosure provides a method, device and equipment for launching an application. The method includes: a mobile terminal presetting one or more initial positions for one or more applications, wherein the one or more initial positions of the one or more applications are located outside the mobile terminal; then determining a target application from the one or more applications according to a current position of the mobile terminal; and then when a moving operation of a user on the mobile terminal is detected, shortening a distance between the mobile terminal and the target application according to the moving operation, then determining a first distance between the mobile terminal and the target application, and furthermore, launching the target application when the first distance is less than a preset threshold.

17 Claims, 9 Drawing Sheets

(56) References Cited

U.S. PATENT DOCUMENTS

| | | | |
|---|---|---|---|
| 9,465,445 B2* | 10/2016 | Burckard | G06F 3/04842 |
| 10,288,446 B2* | 5/2019 | Theytaz | G01C 22/006 |
| 10,692,288 B1* | 6/2020 | Rasmussen | G06T 19/006 |
| 10,955,928 B2 | 3/2021 | Burckard | |
| 10,956,029 B1* | 3/2021 | O'Rourke | G06F 3/04883 |
| 2006/0107213 A1 | 5/2006 | Kumar et al. | |
| 2006/0177103 A1 | 8/2006 | Hildreth | |
| 2009/0217211 A1* | 8/2009 | Hildreth | G06F 3/017 715/863 |
| 2009/0262074 A1 | 10/2009 | Nasiri et al. | |
| 2009/0325647 A1 | 12/2009 | Cho et al. | |
| 2010/0001967 A1 | 1/2010 | Yoo | |
| 2010/0033428 A1 | 2/2010 | Ahn et al. | |
| 2010/0283729 A1 | 11/2010 | Sung et al. | |
| 2013/0076659 A1 | 3/2013 | Miyaji | |
| 2013/0120240 A1 | 5/2013 | Hong | |
| 2013/0222241 A1 | 8/2013 | Jeong | |
| 2014/0009504 A1* | 1/2014 | Lee | G06T 3/20 345/682 |
| 2014/0062874 A1 | 3/2014 | Suggs | |
| 2014/0187166 A1* | 7/2014 | Choi | H04W 84/12 455/41.2 |
| 2014/0195953 A1 | 7/2014 | Sakai et al. | |
| 2014/0225930 A1* | 8/2014 | Durmek | G09G 5/363 345/659 |
| 2015/0143266 A1 | 5/2015 | Strode | |
| 2015/0269436 A1* | 9/2015 | Kim | G06K 9/00624 382/103 |
| 2016/0117076 A1 | 4/2016 | Kim et al. | |
| 2016/0132119 A1* | 5/2016 | Temple | G06F 3/04883 345/168 |
| 2016/0364107 A1 | 12/2016 | Yim et al. | |
| 2016/0370872 A1 | 12/2016 | Burckard | |
| 2017/0064071 A1 | 3/2017 | Won et al. | |
| 2017/0192642 A1* | 7/2017 | Fishman | G06F 3/0485 |
| 2017/0195736 A1* | 7/2017 | Chai | H04N 21/4622 |
| 2017/0199570 A1 | 7/2017 | Kwon et al. | |
| 2017/0228748 A1 | 8/2017 | Shibayama et al. | |
| 2017/0235439 A1* | 8/2017 | Lu | G06F 3/04845 715/812 |
| 2017/0344329 A1 | 11/2017 | Oh et al. | |
| 2018/0027357 A1 | 1/2018 | Kwon | |
| 2018/0109729 A1 | 4/2018 | Jang et al. | |
| 2018/0335936 A1* | 11/2018 | Missig | G06F 21/32 |
| 2018/0335939 A1* | 11/2018 | Karunamuni | G06F 8/38 |
| 2018/0364808 A1 | 12/2018 | Pahud et al. | |

FOREIGN PATENT DOCUMENTS

| | | |
|---|---|---|
| CN | 105045483 A | 11/2015 |
| CN | 105094567 A | 11/2015 |
| CN | 105302463 A | 2/2016 |
| CN | 105975294 A | 9/2016 |
| CN | 106131434 A | 11/2016 |
| CN | 106227423 A | 12/2016 |
| CN | 106575199 A | 4/2017 |
| CN | 106603846 A | 4/2017 |
| CN | 106873873 A | 6/2017 |
| CN | 106970734 A | 7/2017 |
| CN | 107346198 A | 11/2017 |
| CN | 109743438 A | 5/2019 |
| CN | 109753146 A | 5/2019 |
| CN | 109753199 A | 5/2019 |
| CN | 109753209 A | 5/2019 |
| CN | 109753212 A | 5/2019 |

OTHER PUBLICATIONS

International Patent Application No. PCT/CN2019/087862; Int'l Search Report; dated Aug. 8, 2019; 2 pages.

International Patent Application No. PCT/CN2019/086292; Int'l Search Report; dated Jul. 29, 2019; 3 pages.

* cited by examiner

METHOD, DEVICE AND EQUIPMENT FOR LAUNCHING AN APPLICATION

CROSS-REFERENCE TO RELATED APPLICATION

The disclosure is a continuation of PCT Application No. PCT/CN2019/088645, titled "METHOD, DEVICE AND EQUIPMENT FOR LAUNCHING AN APPLICATION", filed on May 27, 2019, which claims priority to Chinese Patent Application No. 201810645574.2, filed on Jun. 21, 2018, the entire contents of both of which are incorporated herein by reference.

TECHNICAL FIELD

The disclosure relates to the field of the Internet, and in particular relates to a method, device and equipment for launching an application.

BACKGROUND ART

Techniques in the field of human-computer interaction have rapidly developed in recent years. The human-computer interaction techniques refer to the technology that realizes the dialogue between human and computers in an effective way through computer input and output devices Therefore, how to realize convenient launching of the application and thus improve user experience, has become an urgent problem to be solved.

SUMMARY

To solve the above problems, the disclosure provides a method, device and equipment for launching an application, and the specific technical solutions adopted in the embodiments of the disclosure are as follows:

In one aspect, the disclosure provides a method for launching an application, applied to a mobile terminal, comprising:

presetting one or more respective initial positions for one or more applications, wherein the one or more respective initial positions of the one or more applications are located outside the mobile terminal;

determining a target application from the applications according to a current position of the mobile terminal;

shortening a distance between the mobile terminal and the target application when a moving operation of a user on the mobile terminal is detected, according to the moving operation, and determining a first distance between the mobile terminal and the target application; and launching the target application when the first distance is less than a preset threshold.

Yet another aspect of the disclosure provides a device for launching an application, applied to a mobile terminal, comprising:

an initial position setting module configured to preset one or more respective initial positions for one or more applications, wherein the one or more respective initial positions of the one or more applications are located outside the mobile terminal;

a current position determination module configured to determine a target application from the applications according to a current position of the mobile terminal;

a first distance determination module configured to shorten a distance between the mobile terminal and the target application when a moving operation of a user on the mobile terminal is detected, according to the moving operation, and determine a first distance between the mobile terminal and the target application; and an application launching module configured to launch the target application when the first distance is less than a preset threshold.

Still another aspect of the disclosure provides an equipment for launching an application, comprising a memory and a processor, wherein the memory is configured to store program codes, and transmitting the program codes to the processor; and the processor is configured to perform any one of the methods of embodiments provided by the disclosure according to instructions in the program codes.

In a method for launching an application provided by the disclosure, a mobile terminal presets one or more respective initial position for one or more application, wherein the one or more respective initial positions of the one or more applications are located outside the mobile terminal; then a target application can be determined from the applications according to a current position of the mobile terminal; and then when a moving operation of a user on the mobile terminal is detected, a distance between the mobile terminal and the target application is shortened according to the moving operation, then a first distance between the mobile terminal and the target application is determined, and furthermore, the target application can be launched when the first distance is less than a preset threshold. It can be seen that by means of the disclosure, in the manner of shortening the distance between the mobile terminal and the target application by moving the mobile terminal according to the will of the user, the target application can be conveniently launched when the distance is less than the preset threshold, and thus the user experience is improved.

BRIEF DESCRIPTION OF THE DRAWINGS

In order to more clearly explain the technical solutions in the embodiments of the disclosure, the drawings required in the description of the embodiments will be briefly introduced below. Obviously, the drawings in the following description are only some embodiments of the disclosure. For those of ordinary skill in the art, without paying any creative labor, other drawings can also be obtained based on these drawings.

DETAILED DESCRIPTION OF THE DISCLOSURE

The technical solutions in embodiments of the disclosure will be further clearly and completely described in detail in combination with the accompanying drawings of the embodiments of the disclosure, and obviously, the described embodiments are only a part of the embodiments, and not all the embodiments of the disclosure. Based on the embodiments of the disclosure, all other embodiments obtained by those of ordinary skill in the art without any inventive work will fall within the scope of protection of the disclosure.

In order to facilitate understanding of the technical solutions provided by the disclosure, application scenes of the disclosure in practice are firstly introduced below.

Figure 1:
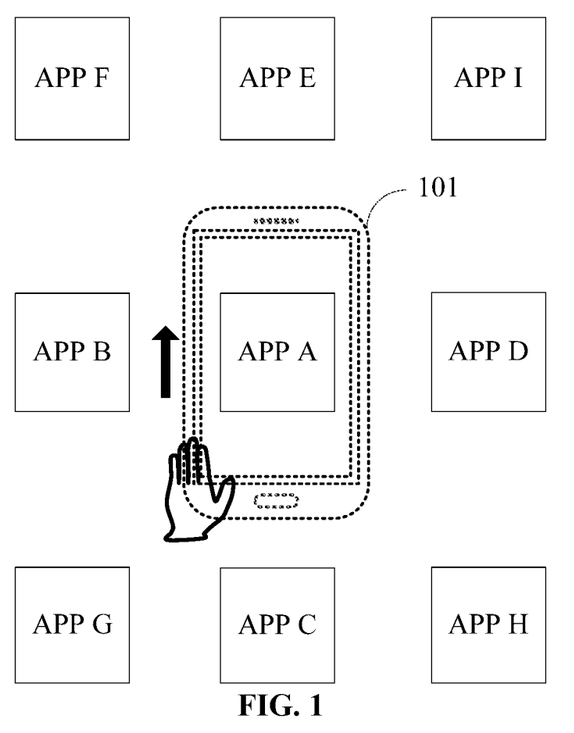
FIG. 1 is a schematic diagram of an actual application scenario of a method for launching an application provided by an embodiment of the disclosure.

Referring to FIG. 1 which illustrates a diagram of an exemplary application scene of an embodiment of the disclosure, as shown in FIG. 1, a method for launching an application provided by the disclosure can be applied to an application scene comprising a mobile terminal 101 and applications (application A, application B and the like as shown in FIG. 1) located outside the mobile terminal 101, wherein the mobile terminal 101 is any user equipment that can perform human-computer interaction and then launch an application according to user intention, such as a smart phone, a tablet personal computer, and a laptop personal computer; a position of an application may be preset outside the mobile terminal by the mobile terminal, for example, one or more applications can be distributed on a virtual plane, as shown in FIG. 1, or in other position distribution modes, such as stereoscopic spatial distribution, wherein the display content of an application interface may be an image corresponding to initial launching of the application, or an interface corresponding to a running state after the application startup. The specific display image and position distribution mode can be set according to actual conditions and are not limited herein.

In actual application, the mobile terminal 101 presets one or more respective initial positions for one or more applications outside a screen display area of the mobile terminal, for example, the one or more application can be spread on a virtual plane, as show in FIG. 1, so that the mobile terminal 101 can be close to the different applications when the user moves the mobile terminal 101. As shown in FIG. 1, the user can move the mobile terminal 101 in the direction of the arrow shown in the figure to move the mobile terminal 101 upward in the direction close to an application E. In the moving process of the mobile terminal 101, a certain application around the mobile terminal 101 can be set as a target application in real time according to the current position of the mobile terminal 101, for example, if the user determines the current position of the mobile terminal 101 to be the position of an application A in the figure, then the four applications on the upper side, lower side, left side and right side of the application A are respectively an application E, an application C, an application B and an application D, and one of the applications, for example the application D, can be set as the target application. Then, when the mobile terminal 101 detects that the user moves the mobile terminal 101 rightwards, the distance between the mobile terminal 101 and the target application D can be gradually shortened according to the operation, the distance between the mobile terminal 101 and the target application D is determined as a first distance, and when the first distance is less than a preset threshold, the target application D can be launched and displayed on the mobile terminal 101 for users to use. For example, if the preset threshold is assumed to be 2 cm, when the distance between the mobile terminal 101 and the target application D, i.e., the first distance, is less than 2 cm, the target application D can be started and displayed on the mobile terminal 101 for user to use.

Therefore, in the manner of shortening the distance between the mobile terminal and the target application by moving the mobile terminal according to the will of the user, the target application can be conveniently launched when the distance is less than the preset threshold, so that the present problem that the launching process of the application is too cumbersome and inconvenience is solved, the convenience of user operation is improved, and thus the user experience is improved. It should be understood by those skilled in the art that the frame diagram shown in FIG. 1 is merely one example in which the embodiments of the disclosure can be implemented. The limitation of the embodiments of the disclosure is not limited by any aspect of the diagram.

Based on the above application scene, an embodiment of the disclosure provides a method for launching an application which is described in detail below in combination with the accompanying drawings.

Figure 2:
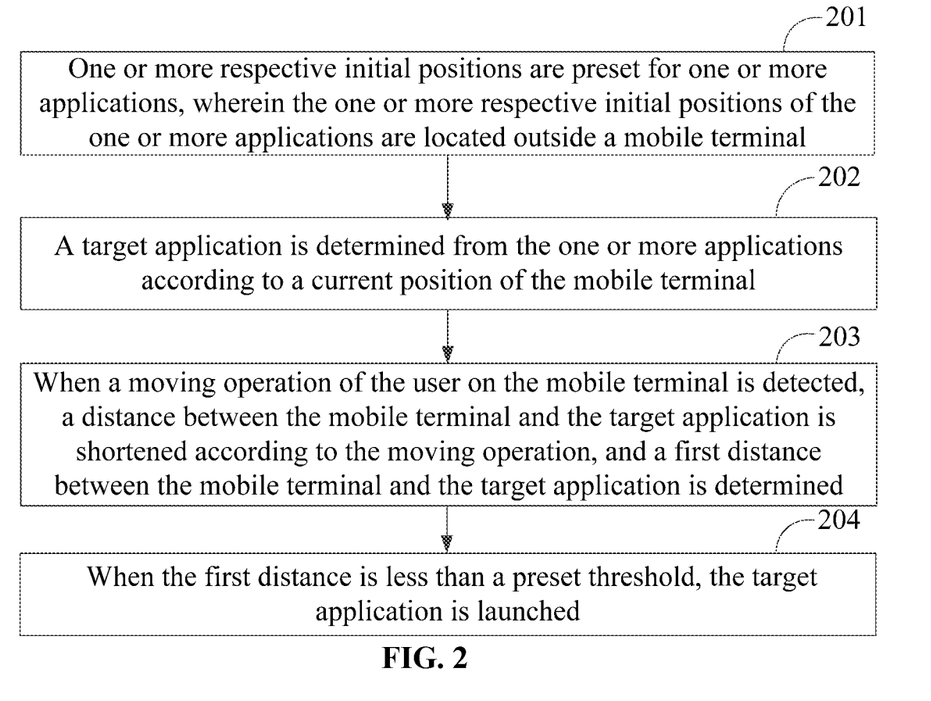
FIG. 2 is a block flow diagram of a method for launching an application provided by an embodiment of the disclosure.

FIG. 2 illustrates a flow chart of a method for launching an application provided by an embodiment of the disclosure. As shown in FIG. 2, the method comprises the following steps.

S201, one or more respective initial positions are preset for one or more applications, wherein the one or more respective initial positions of the one or more applications are located outside a mobile terminal.

In practical application, when using the mobile terminal, people frequently face the requirement of skipping from the current application to another application, such as skipping from an interface of a social network APP to an interface of a navigation APP to search a travel route, and the like. With the development of network technology, various applications emerge endlessly, and a plurality of different applications such as financial applications, shopping applications and learning applications may be installed on one mobile terminal at the same time, and in order to improve the convenience of launching the applications, in the disclosure, one or more respective initial positions are preset for one or more applications outside the mobile terminal, and a frame corresponding to initial launching of an application or a frame corresponding to a certain running state after the application start up is used as an interface of the application.

During the process of setting the initial positions for the applications, the disclosure provides three embodiments as follows.

In one embodiment, the one or more applications are distributed on a same plane according to a first preset rule.

Figure 3:
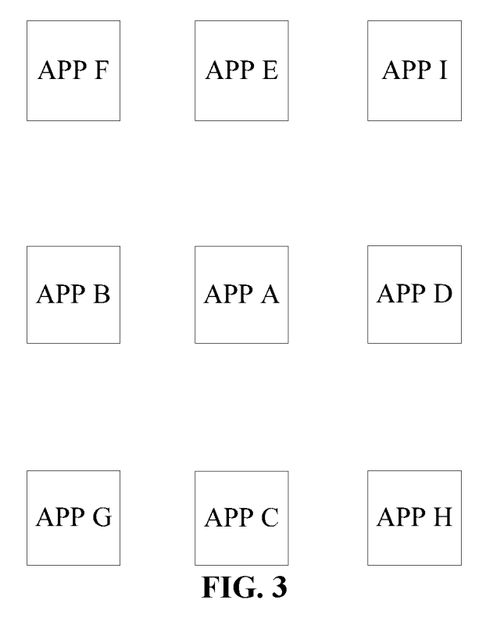
FIG. 3 is a first schematic diagram illustrating initial positions of applications provided by an embodiment of the disclosure.

In the embodiment, the first preset rule is that the applications are distributed on a virtual plane. For example, as shown in FIG. 3 which is a schematic diagram illustrating the initial positions of the one or more application provided by the embodiment of the disclosure, if an application A is located at a center position of the virtual plane, an application B, an application C, an application D and an application E can be distributed respectively on the left side, lower side, right side and upper side of the application A on the plane correspondingly, and similarly, an application F, an application G, an application H and an application I can be distributed respectively at the upper left side, lower left side, lower right side and upper right side of the application A.

In another embodiment, the applications are distributed on different planes according to a second preset rule, and the planes on which the different applications are distributed are parallel to one another.

Figure 4:
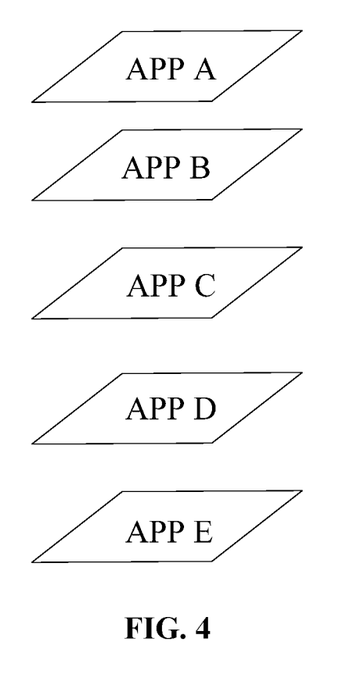
FIG. 4 is a second schematic diagram illustrating the initial positions of applications provided by an embodiment of the disclosure.
Figure 5:
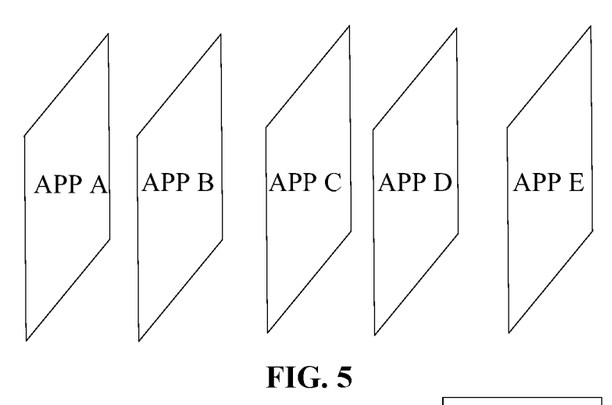
FIG. 5 is a schematic diagram illustrating the initial positions of applications provided by an embodiment of the disclosure.
Figure 6:
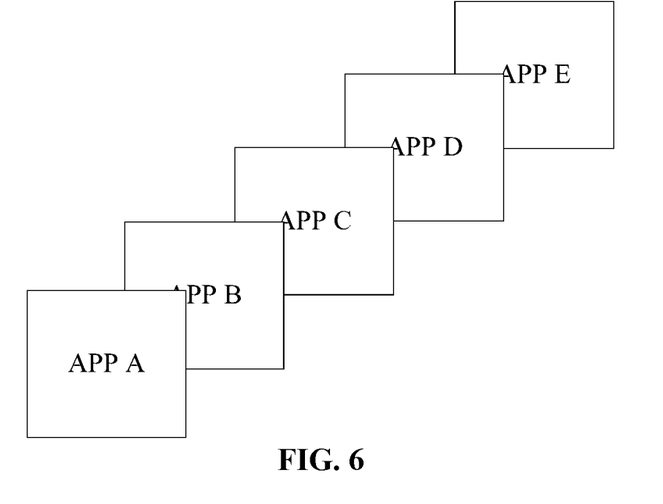
FIG. 6 is a schematic diagram illustrating the initial positions of applications provided by an embodiment of the disclosure.

In the embodiment, the second preset rule is that the applications are distributed on different planes, and the planes are parallel to one another. For example, as shown in FIG. 4 which is another schematic diagram illustrating the respective initial positions of one or more applications provided by the embodiment of the disclosure, the application A, the application B, the application C, the application D and the application E are correspondingly located on different planes, and the planes on which the applications are distributed are parallel to one another in an up-down direction, or as shown in FIG. 5, the planes on which the applications are located can also be parallel to one another in a left-right direction, or as shown in FIG. 6, the planes on which the applications are located can also be parallel to one another in a front-back direction.

In addition, still in another embodiment, one or more applications are distributed in a preset stereoscopic space according to a third preset rule.

Figure 7:
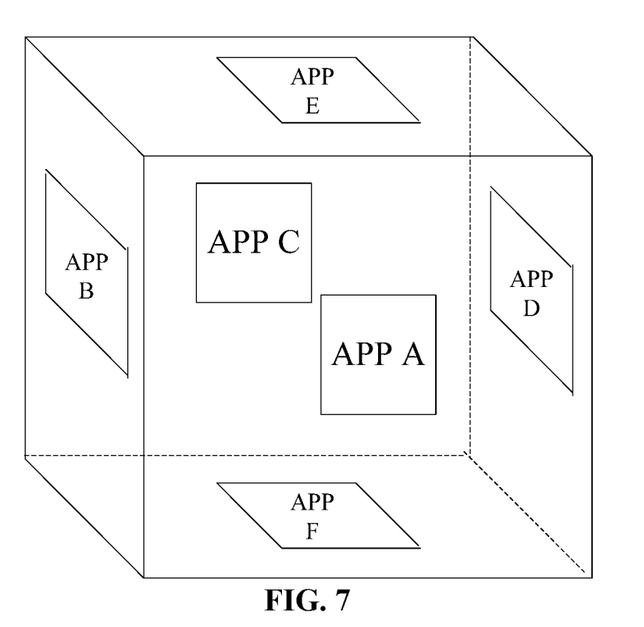
FIG. 7 is a schematic diagram illustrating the initial positions of applications provided by an embodiment of the disclosure.

In the embodiment, the third preset rule is that the applications are distributed in the stereoscopic space. For example, as shown in FIG. 7 which is another schematic diagram illustrating initial positions of applications provided by the embodiment of the disclosure, the application A, the application B, the application C, the application D, the application E and the application F may be correspondingly distributed on different planes, and the planes on which the applications are located can form a stereoscopic space, such as a cube in the stereoscopic space as shown in FIG. 7.

It should be understood that the above distribution of applications is exemplary only. And in the embodiment, the applications may also be distributed in accordance with other distribution, which is not limited herein.

After presetting the respective initial positions for one or more applications, S202 can be further executed.

S202: a target application is determined from the one or more applications according to a current position of the mobile terminal.

In practical application, after presetting the initial position for the applications in the S201, the applications around, such as on the left side, lower side, right side, upper side, upper left side, lower left side, lower right side and upper right side of the mobile terminal can be determined according to the current position of the mobile terminal, so that one of the applications can be selected by the user to serve as the target application, and convenient startup of the target application can be achieved by using the embodiment.

In one embodiment of the disclosure, the current position of the mobile terminal in the S202 can be determined according to the following steps:

step A: a first moving direction and a first moving distance of the mobile terminal which moves based on an original position are acquired, wherein the original position is a position where the mobile terminal is located before moving; and step B: the current position of the mobile terminal is determined according to the first moving direction and the first moving distance.

In the embodiment, the position where the mobile terminal is located before moving is the original position. When the user moves the mobile terminal, a self-moving direction based on the original position can be acquired by the mobile terminal to serve as the first moving direction; similarly, a self-moving distance based on the original position can be acquired by the mobile terminal to serve as the first moving distance; and a position to which the mobile terminal moves, namely the current position of the mobile terminal, can be determined according to the acquired moving direction and moving distance, namely the first moving direction and the first moving distance.

Figure 8:
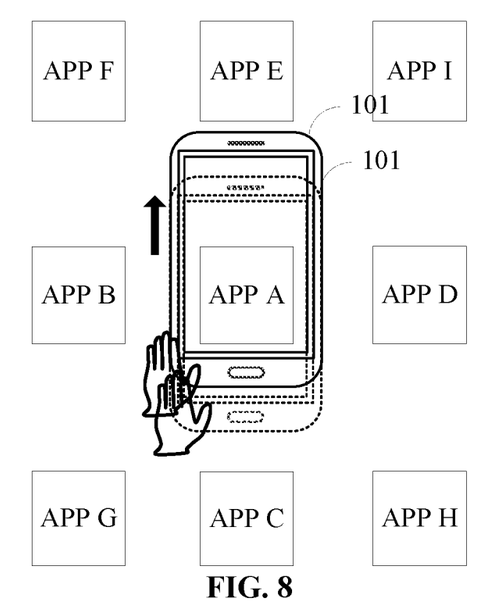
FIG. 8 is a schematic diagram of determining a current location of a mobile terminal provided by an embodiment of the disclosure.

For example, as shown in FIG. 8 which is a schematic diagram of determining the current position of the mobile terminal provided by the embodiment of the disclosure, The position on which the mobile terminal is located before moving, namely the position of the application A, is set to be the original position of the mobile terminal, and the user can move the mobile terminal in the direction of an arrow shown in the figure; and during the moving process, the self-moving direction based on the original position can be acquired by the mobile terminal to serve as the first moving direction, as shown in FIG. 8, the first moving direction refers to upward movement, and meanwhile, the self-moving distance based on the original position can be acquired to serve as the first moving distance. Then, the position to which the mobile terminal moves, namely the current position of the mobile terminal, can be determined. As shown in FIG. 8, if the user moves the mobile terminal 101 upwards to the position of the application E, the current position of the mobile terminal can be determined to be the position of the application E.

Furthermore, the user can check the applications distributed around the current position according to the current position of the mobile terminal. For example, still as shown in FIG. 8, if the current position of the mobile terminal is determined to be the position of the application E, the user can check the applications distributed around the current position, such as the application F on the left side and the application I on the right side, and then if the user wants to start one application by using the method provided by the embodiment, the mobile terminal can determine the application to be the target application, for example, the application I on the right side can be determined to be the target application.

In some possible embodiments of the disclosure, the first moving direction in the step A may be determined to be at least one of upward, downward, leftward, rightward, forward and backward according to the different distributed initial positions of the applications.

Figure 9:
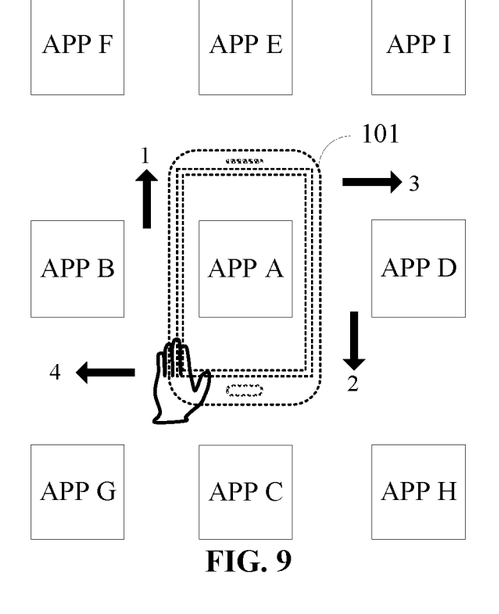
FIG. 9 is a first schematic diagram illustrating a moving direction of a mobile terminal provided by an embodiment of the disclosure.

For example, as shown in FIG. 9, when the applications are distributed on the same plane according to the first preset rule, the position on which the mobile terminal is located before moving, namely the position of the application A, is set to be the original position of the mobile terminal, and the user can move the mobile terminal based on arrow directions in the figure to launch the target application, wherein if the mobile terminal moves in the direction of an arrow 1, the corresponding moving direction is upward; correspondingly, if the mobile terminal moves in the direction of an arrow 2, the corresponding moving direction is downward; if the mobile terminal moves in the direction of an arrow 3, the corresponding moving direction is rightward; and if the mobile terminal moves in the direction of an arrow 4, the corresponding moving direction is leftward.

Figure 10:
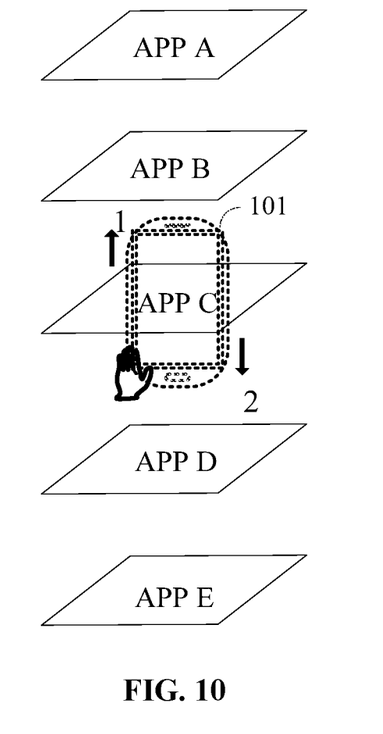
FIG. 10 is a second schematic diagram illustrating a moving direction of a mobile terminal provided by an embodiment of the disclosure.

Further as shown in FIG. 10, when the applications are distributed on the different planes according to the second preset rule, and the planes on which the different applications are distributed are parallel to one another in the up-down direction, the position on which the mobile terminal is located before moving, namely the position of the application C, is set to be the original position of the mobile terminal, and the user can move the mobile terminal based on arrow directions in the figure to launch the target application, wherein if the mobile terminal moves in the direction of an arrow 1, the corresponding moving direction is upward, and correspondingly, if the mobile terminal moves in the direction of an arrow 2, the corresponding moving direction is downward.

Figure 11:
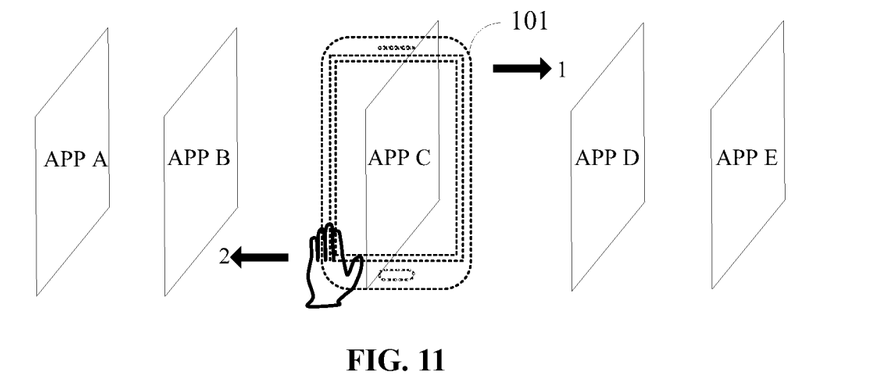
FIG. 11 is a third schematic diagram illustrating a moving direction of a mobile terminal provided by an embodiment of the disclosure.

Further as shown in FIG. 11, when the applications are distributed on the different planes according to the second preset rule, and the planes on which the different applications are distributed are parallel to one another in the left-right direction, the position on which the mobile terminal is located before moving, namely the position of the application C, is set to be the original position of the mobile terminal, and the user can only move the mobile terminal leftward or rightward based on arrow directions in the figure to launch the target application, wherein if the mobile terminal moves in the direction of an arrow 1, the corresponding moving direction is rightward, and correspondingly, if the mobile terminal moves in the direction of an arrow 2, the corresponding moving direction is leftward.

Figure 12:
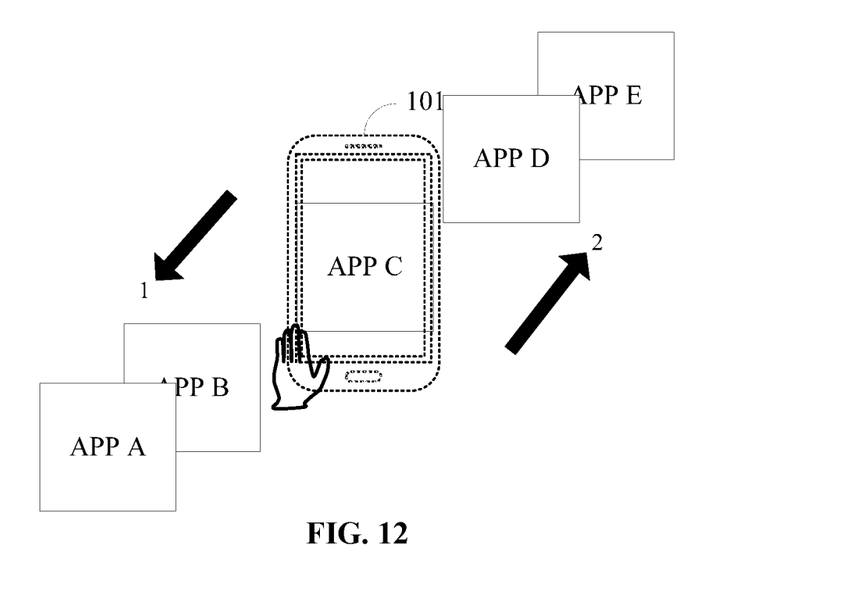
FIG. 12 is a forth schematic diagram illustrating a moving direction of a mobile terminal provided by an embodiment of the disclosure.

Further as shown in FIG. 12, when the applications are distributed on the different planes according to the second preset rule, and the planes on which the different applications are distributed are parallel to one another in the front-back direction, the position on which the mobile terminal is located before moving, namely the position of the application C, is set to be the original position of the mobile terminal, and the user can move the mobile terminal forward or backward only based on arrow directions in the figure to launch the target application, wherein if the mobile terminal moves in the direction of an arrow 1, the corresponding moving direction is forward, and correspondingly, if the mobile terminal moves in the direction of an arrow 2, the corresponding moving direction is backward.

Figure 13:
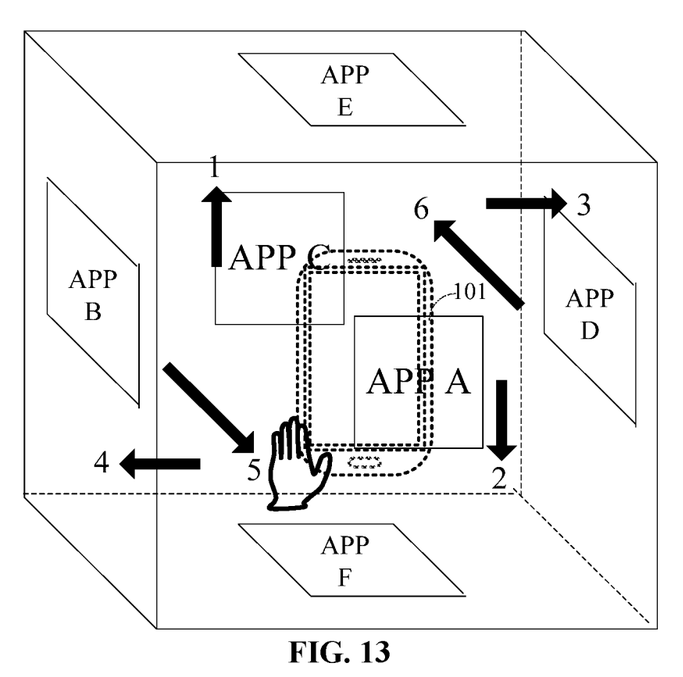
FIG. 13 is a fifth schematic diagram illustrating a moving direction of a mobile terminal provided by an embodiment of the disclosure.

Further as shown in FIG. 13, when the applications are distributed in the stereoscopic space according to the third preset rule, the position on which the mobile terminal is located before moving, namely the center position of the cube, is set to be the original position of the mobile terminal, and the user can move the mobile terminal around based on arrow directions in the figure to launch the target application, wherein if the mobile terminal moves in the direction of an arrow 1, the corresponding moving direction is upward; correspondingly, if the mobile terminal moves in the direction of an arrow 2, the corresponding moving direction is downward; if the mobile terminal moves in the direction of an arrow 3, the corresponding moving direction is rightward; if the mobile terminal moves in the direction of an arrow 4, the corresponding moving direction is leftward; if the mobile terminal moves in the direction of an arrow 5, the corresponding moving direction is forward; and if the mobile terminal moves in the direction of an arrow 6, the corresponding moving direction is backward.

In some possible embodiments of the disclosure, the first moving direction in the step A is acquired via at least one of an acceleration sensor, a gyroscope sensor and a camera sensor arranged on the mobile terminal.

In the embodiments, the moving direction of the mobile terminal can be acquired by using at least one of the acceleration sensor, the gyroscope sensor and the camera sensor arranged on the mobile terminal.

In some possible embodiments of the disclosure, the first moving distance in the step A can be determined according to the following steps:

a moving speed of the mobile terminal can be acquired via the acceleration sensor and a timer arranged on the mobile terminal, and integration is performed on the moving speed to acquire the first moving distance; and in practical application, first acceleration of movement of the mobile terminal can be acquired according to the acceleration sensor arranged on the mobile terminal, meanwhile, first time of movement of the mobile terminal can be acquired according to the timer arranged on the mobile terminal, then, a first speed of movement of the mobile terminal can be acquired according to the first acceleration and the first time, and finally, integration is performed on the first speed in a first time zone, and thus the first moving distance in the step A can be acquired; or, when the mobile terminal moves in the first moving direction, the position change of feature points between each two adjacent frames in an ambient image shot by a camera sensor arranged on the mobile terminal can be used for determining a moving distance of the mobile terminal between each two adjacent frames, and then moving distances of the mobile terminal between the adjacent frames can be accumulated to acquire the first moving distance. For example, if the mobile terminal takes 3 seconds to move in the first moving direction, the camera shoots a 3-second video which is composed of images shot according to the frequency of 30 frames per second, so that the video includes 90 frames in total, and the moving distance of the mobile terminal between shooting moments of each two adjacent frames is determined according to the position change of the feature points in the two adjacent frames. Therefore, the first moving distance of the mobile terminal during a shooting process of the 3-second video can be acquired by accumulating the distances.

It should be noted that in the step A, the mobile terminal can determine an acquisition mode of the first moving distance according to the first acceleration acquired by the acceleration sensor. For example, when the first acceleration is less than or equal to a preset acceleration threshold, the first moving distance can be determined by using the ambient image shot by the camera sensor; and correspondingly, when the first acceleration is more than the preset acceleration threshold, the first moving distance can be determined by using the timer and the acceleration sensor.

It can be understood that the mode of determining the first moving distance through the timer and the acceleration sensor is more suitable for scenes where the mobile terminal moves slowly and stably. And the mode of determining the first moving distance by using the ambient image shot by the camera sensor is suitable for scenes where the mobile terminal moves rapidly.

After determining the target application from the applications according to the current position of the mobile terminal, S203 can be executed.

S203: when a moving operation of the user on the mobile terminal is detected, a distance between the mobile terminal and the target application is shortened according to the moving operation, and a first distance between the mobile terminal and the target application is determined.

In practical application, after the target application is determined through the S202, the user further moves the mobile device towards the position of the target application, and when the moving operation of the user on the mobile terminal is detected, if it is detected that the user moves the mobile terminal rightwards, the distance between the mobile terminal and the target application on the right side can be shortened according to the moving operation, and then the first distance between the mobile terminal and the target application can be determined in real time, that is, the first distance refers to the distance between the mobile terminal and the target application.

In some possible embodiments of the disclosure, the implementation process of the S203 comprises the following steps.

Step C: the moving operation of the user on the mobile terminal is detected.

In practical application, after determining the target application, the moving operation implemented by the user on the mobile terminal for launching the target application can be further detected, and thus the mobile terminal can be close to the target application.

step D: a second moving direction and a second moving distance of the mobile terminal which moves based on the current position can be acquired according to the moving operation.

In practical application, when the mobile operation of the user on the mobile terminal is detected through the step C, the second moving direction and the second moving distance of the mobile terminal that moves towards the position of the target application based on the current position can be acquired by using at least one of the acceleration sensor, the gyroscope sensor and the camera sensor arranged on the mobile terminal, wherein the determination mode of the second moving direction is accordant with that of the first moving direction in the step A, and related parts can be seen from introduction of the determination mode of the first moving direction in the step A and are not repeated herein; and similarly, the determination mode of the second moving distance is also similar to that of the first moving distance in the above step A, and related parts can be seen from introduction related to the determination mode of the first moving direction in the step A, that is, second acceleration of movement of the mobile terminal can be acquired according to the acceleration sensor arranged on the mobile terminal, meanwhile, second time of movement of the mobile terminal can be acquired according to the timer arranged on the mobile terminal, a second speed of movement of the mobile terminal can then be acquired according to the second acceleration and the second time, and finally, integration is performed on the second speed in a second time zone, and thus the second moving distance in the step D can be acquired; or when the mobile terminal moves in the second moving direction, the position change of feature points between each two adjacent frames in an ambient image shot by a camera sensor arranged on the mobile terminal can be used for determining a moving distance of the mobile terminal between each two adjacent frames, and then the moving distances of the mobile terminal between the adjacent frames can be accumulated to acquire the second moving distance in the step D.

Step E: the first distance between the mobile terminal and the target application is determined according to the current position of the mobile terminal, the position of the target application, the second moving direction and the second moving distance.

In practical application, after acquiring the current position of the mobile terminal, the position of the target application, the second moving direction and the second moving distance through the step D, a distance value between the mobile terminal and the target application can be determined to serve as the first distance.

After acquiring the first distance between the mobile terminal and the target application, S204 can be executed.

S204: when the first distance is less than a preset threshold, the target application is launched.

In practical application, a user can preset a distance threshold between the mobile terminal and the target application on the mobile terminal to determine whether to launch the target application or not, and when it is determined that the distance between the mobile terminal and the target application is less than the threshold, the target application can be launched and displayed on the mobile terminal; when it is determined that the distance between the mobile terminal and the target application is not less than the threshold, that is, a first distance value does not reach a preset threshold, the target application cannot be launched. For example, the threshold can be set to be 1 cm, and when it is determined that the distance between the mobile terminal and the target application is less than 1 cm, the target application can be launched, and correspondingly, when it is determined that the distance between the mobile terminal and the target application is not less than 1 cm, that is, the first distance value does not reach the preset threshold, the target application cannot be launched.

In this way, in the method for launching an application provided by the disclosure, the mobile terminal presets one or more respective initial positions for one or more applications, wherein the initial positions of the applications are located outside the mobile terminal; then the target application can be determined from the applications according to the current position of the mobile terminal; then after detecting a moving operation of the user on the mobile terminal, a distance between the mobile terminal and the target application is shortened according to the moving operation, and then the first distance between the mobile terminal and the target application is determined; and furthermore, the target application can be launched when the first distance is less than the preset threshold. It can be seen that by means of the disclosure, in the manner of shortening the distance between the mobile terminal and the target application by moving the mobile terminal according to the will of the user, the target application can be conveniently launched when the distance is less than the preset threshold, and thus the user experience is improved.

Figure 14:
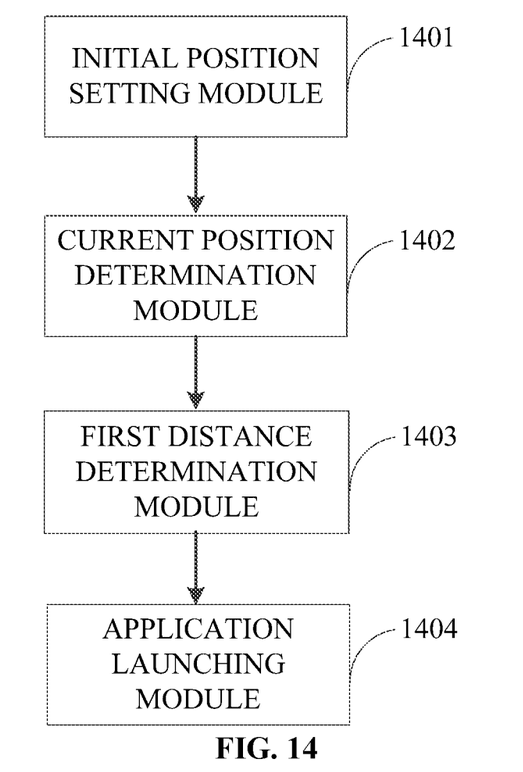
FIG. 14 is a block flow diagram of a device for launching an application provided by an embodiment of the disclosure.

Based on the above method for launching an application, the disclosure also provides a device for launching an application, which is applied to a mobile terminal and comprises:

an initial position setting module 1401 configured to preset one or more respective initial positions for one or more applications, wherein the initial positions of applications are located outside the mobile terminal;

a current position determination module 1402 configured to determine a target application from the applications according to a current position of the mobile terminal;

a first distance determination module 1403 configured to shorten a distance between the mobile terminal and the target application, when a moving operation of a user on the mobile terminal is detected, according to the moving operation, and to determine a first distance between the mobile terminal and the target application; and an application launching module 1404 configured to launch the target application when the first distance is less than a preset threshold.

Optionally, the initial position setting module 1401 is configured to:

distribute the applications on a same plane according to a first preset rule; or, distribute the applications on different planes according to a second preset rule, wherein the planes on which the different applications are distributed are parallel to one another; or, distribute the applications in a preset stereoscopic space according to a third preset rule.

Optionally, the current position determination module 1402 comprises:

a first acquisition sub-module configured to acquire a first moving direction and a first moving distance of the mobile terminal which moves based on an original position, wherein the original position is a position where the mobile terminal is located before moving; and a current position determination sub-module configured to determine the current position of the mobile terminal according to the first moving direction and the first moving distance.

Optionally, the first distance determination module 1403 comprises:

a detection sub-module configured to detect the moving operation of the user on the mobile terminal;

a second acquisition sub-module configured to acquire, according to the moving operation, a second moving direction and a second moving distance of the mobile terminal that moves based on the current position; and a first distance determination sub-module configured to determine the first distance between the mobile terminal and the target application according to the current position of the mobile terminal, the initial position of the target application, the second moving direction and the second moving distance.

Optionally, the first moving direction and the second moving direction are acquired through at least one of an acceleration sensor, a gyroscope sensor and a camera sensor arranged on the mobile terminal.

Optionally, the first moving direction and the second moving direction are respectively at least one of upward, downward, leftward, rightward, forward and backward.

Optionally, the device also comprises:

a moving distance acquisition module configured to acquire a moving speed of the mobile terminal via the acceleration sensor and a timer arranged on the mobile terminal, and to integrate the moving speed to acquire the first moving distance and the second moving distance; or acquire an ambient image via a camera arranged on the mobile terminal, acquire a distance between each two adjacent frames in the ambient image, and add the distances between the adjacent frames together to acquire the first moving distance and the second moving distance.

In this way, in the device for launching an application provided by the disclosure, the mobile terminal presets the initial position for each application, wherein the initial position of each application is located outside the mobile terminal; then the target application can be determined from the applications according to the current position of the mobile terminal; then after detecting a moving operation of the user on the mobile terminal, the distance between the mobile terminal and the target application is shortened according to the moving operation, and then the first distance between the mobile terminal and the target application is determined; and furthermore, the target application can be launched when the first distance is less than the preset threshold. It can be seen that by means of the disclosure, in the manner of shortening the distance between the mobile terminal and the target application by moving the mobile terminal according to the will of the user, the target application can be conveniently launched when the distance is less than the preset threshold, and thus the user experience is improved.

Figure 15:
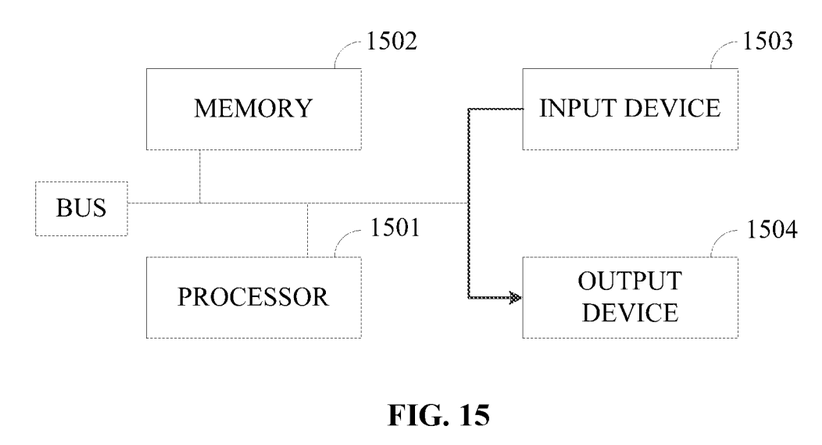
FIG. 15 is a block flow diagram of an equipment for launching an application provided by an embodiment of the disclosure.

Correspondingly, an embodiment of the present invention also provides an application startup device, as shown in FIG. 15, which may include:

the processor 1501, the memory 1502, the input device 1503, and the output device 1504. The number of processors 1501 in the device for launching an application may be one or more, and one processor is used as an example in FIG. 15. In some embodiments of the disclosure, the processor 1501, the memory 1502, the input device 1503, and the output device 1504 may be connected through a bus or in other ways. In FIG. 15, connection through a bus is used as an example.

The memory 1502 may be used to store software programs and modules. The processor 1501 runs the software programs and modules stored in the memory 1502 to execute application programs to start various functional applications and data processing of the device. The memory 1502 may mainly include an area for storing program and an area for storing data, and the area for storing program may store an operating system, application programs required for at least one function, and the like. In addition, the memory 1502 may include a high-speed random access memory, and may also include a non-volatile memory, such as at least one magnetic disk storage device, a flash memory device, or other volatile solid-state storage devices. The input device 1503 can be used to receive input numeric or character information, and generate signal input related to user settings and function control of the device for launching an application.

Specifically, in the embodiment, the processor 1501 loads the executable file corresponding to the process of one or more application programs into the memory 1502 according to the instructions, and the processor 1501 runs the application program stored in the memory 1502, so as to realize various functions in the above methods for launching an application.

For the device embodiments, since it basically corresponds to the method embodiments, the relevant part can be referred to the description of the method embodiments. The device embodiments described above are only schematics, wherein the modules described as separate components may or may not be physically separated, and the components displayed as modules may or may not be physical modules, that is, it may be located in one place, or it may be distributed to multiple network elements. Some or all of the modules may be selected according to actual needs to achieve the purpose of the solution of this embodiment.

Those of ordinary skill in the art can understand and implement without paying creative labor.

It should be noted that in this description, relational terms such as first and second etc. are only used to distinguish one entity or operation from another, and do not necessarily require or imply any such actual relationship or order between these entities or operations. Moreover, the term "include", "comprise" or any other variation thereof is intended to cover non-exclusive inclusion, so that a process, method, device or equipment including a series of elements includes not only those elements, but also other elements not explicitly listed, or elements inherent in such process, method, device or equipment. Without further restrictions, the element defined by the sentence "include one . . . " does not exclude other identical elements included in the process, method, device or equipment that includes the element.

The method, device and equipment for launching an application provided by the embodiments of the disclosure are described in detail above. Specific examples are used in this article to explain the principles and implementation of the disclosure. The descriptions of the above embodiments are only for help understanding the methods and core ideas of the disclosure; meanwhile, for those of ordinary skill in the art, according to the ideas of the disclosure, there may be changes in the specific implementation and application scope. In summary, the content of this specification should not be understood as a limitation of this disclosure.

What is claimed is:

1. A method for launching an application, applied to a hand-held mobile terminal, comprising:
   presetting one or more respective initial positions for one or more applications, wherein the one or more respective initial positions of the one or more applications are located on a virtual plane outside a screen display of the mobile terminal;
   acquiring a first moving direction and a first moving distance of the mobile terminal which moves based on an original position, wherein the original position is a position where the mobile terminal is located before moving;
   determining a current position of the mobile terminal based on the first moving direction and the first moving distance;
   determining a target application among the one or more applications based on the current position of the mobile terminal and the one or more respective initial positions of the one or more applications;
   determining a distance between the mobile terminal and an initial position of the target application among the one or more respective initial positions of the one or more applications in response to detecting a moving operation of a user on the mobile terminal; and
   launching the target application when the distance between the mobile terminal and the initial position of the target application is less than a preset threshold.

2. The method of claim 1, wherein the presetting one or more respective initial positions for one or more applications comprises:
   distributing the one or more applications on a same plane according to a first preset rule; or,
   distributing the one or more applications on different planes according to a second preset rule, wherein the planes on which different applications are distributed are parallel to one another; or,
   distributing the one or more applications in a preset stereoscopic space according to a third preset rule.

3. The method of claim 1, wherein the determining a distance between the mobile terminal and an initial position of the target application among the one or more respective initial positions of the one or more applications in response to detecting a moving operation of a user on the mobile terminal further comprises:
   acquiring, according to the moving operation, a second moving direction and a second moving distance of the mobile terminal which moves based on the current position of the mobile terminal; and
   determining the distance between the mobile terminal and the initial position of the target application based on the current position of the mobile terminal, the initial position of the target application, the second moving direction and the second moving distance of the mobile terminal.

4. The method of claim 3, wherein the first moving direction and the second moving direction are acquired via at least one of an acceleration sensor, a gyroscope sensor and a camera sensor arranged on the mobile terminal.

5. The method of claim 3, wherein the first moving direction and the second moving direction are at least one of upward, downward, leftward, rightward, forward and backward.

6. The method of claim 3, wherein the first moving distance and the second moving distance of the mobile terminal are determined based on:
   acquiring a moving speed of the mobile terminal via an acceleration sensor and a timer arranged on the mobile terminal and integrating the moving speed to acquire the first moving distance and the second moving distance.

7. The method of claim 3, wherein the first moving distance and the second moving distance of the mobile terminal are determined based on:
   acquiring an ambient image via a camera sensor arranged on the mobile terminal;
   acquiring a distance between each two adjacent frames in the ambient image; and
   adding the distances between the adjacent frames together to acquire the first moving distance and the second moving distance.

8. A device for launching an application, applied to a hand-held mobile terminal, comprising:
   at least one processor; and
   at least one memory communicatively coupled to the at least one processor and storing instructions that upon execution by the at least one processor cause the device to:
   preset one or more respective initial positions for one or more applications, wherein the one or more respective initial positions of the one or more applications are located on a virtual plane outside a screen display of the mobile terminal;
   acquire a first moving direction and a first moving distance of the mobile terminal which moves based on an original position, wherein the original position is a position where the mobile terminal is located before moving;
   determine a current position of the mobile terminal according to the first moving direction and the first moving distance;
   determine a target application among the one or more applications based on the current position of the mobile terminal and the one or more respective initial positions of the one or more applications;

determine a distance between the mobile terminal and an initial position of the target application among the one or more respective initial positions of the one or more applications in response to detecting a moving operation of a user on the mobile terminal; and launch the target application when the distance between the mobile terminal and the initial position of the target application is less than a preset threshold.

9. The device of claim 8, wherein the at least one memory further stores instructions that upon execution by the at least one processor cause the device system to:
distribute the one or more applications on a same plane according to a first preset rule; or,
distribute the one or more applications on different planes according to a second preset rule, wherein the planes on which different applications are distributed are parallel to one another; or
distribute the one or more applications in a preset stereoscopic space according to a third preset rule.

10. The device of claim 8, wherein the at least one memory further stores instructions that upon execution by the at least one processor cause the device to:
acquire, according to the moving operation, a second moving direction and a second moving distance of the mobile terminal which moves based on the current position of the mobile terminal; and
determine the distance between the mobile terminal and the initial position of the target application based on the current position of the mobile terminal, the initial position of the target application, the second moving direction and the second moving distance of the mobile terminal.

11. The device of claim 10, wherein the first moving direction and the second moving direction are acquired via at least one of an acceleration sensor, a gyroscope sensor and a camera sensor arranged on the mobile terminal.

12. The device of claim 10, wherein the first moving direction and the second moving direction are at least one of upward, downward, leftward, rightward, forward and backward.

13. The device of claim 10, the at least one memory further stores instructions that upon execution by the at least one processor cause the device system to:
acquire a moving speed of the mobile terminal via an acceleration sensor and a timer arranged on the mobile terminal, and integrate the moving speed to acquire the first moving distance and the second moving distance.

14. The device of claim 10, the at least one memory further stores instructions that upon execution by the at least one processor cause the device system to:
acquire an ambient image via a camera sensor arranged on the mobile terminal, acquire a distance between each two adjacent frames in the ambient image, and add the distances between the adjacent frames together to acquire the first moving distance and the second moving distance.

15. A non-transitory storage medium, storing executable instructions and being configured to perform operations when the executable instructions are executed, the operations applied to a hand-held mobile terminal, comprising:
presetting one or more respective initial positions for one or more applications, wherein the one or more respective initial positions of the one or more applications are located on a virtual plane outside a screen display of the mobile terminal;
acquiring a first moving direction and a first moving distance of the mobile terminal which moves based on an original position, wherein the original position is a position where the mobile terminal is located before moving;
determining a current position of the mobile terminal based on the first moving direction and the first moving distance;
determining a target application among the one or more applications based on the current position of the mobile terminal and the one or more respective initial positions of the one or more applications;
determining a distance between the mobile terminal and an initial position of the target application among the one or more respective initial positions of the one or more applications in response to detecting a moving operation of a user on the mobile terminal; and
launching the target application when the distance between the mobile terminal and the initial position of the target application is less than a preset threshold.

16. The non-transitory storage medium of claim 15, wherein the presetting one or more respective initial positions for one or more applications comprises:
distributing the one or more applications on a same plane according to a first preset rule; or,
distributing the one or more applications on different planes according to a second preset rule, wherein the planes on which different applications are distributed are parallel to one another; or,
distributing the one or more applications in a preset stereoscopic space according to a third preset rule.

17. The non-transitory storage medium of claim 15, wherein the determining a distance between the mobile terminal and an initial position of the target application among the one or more respective initial positions of the one or more applications in response to detecting a moving operation of a user on the mobile terminal further comprises:
acquiring, according to the moving operation, a second moving direction and a second moving distance of the mobile terminal which moves based on the current position of the mobile terminal; and
determining the distance between the mobile terminal and the initial position of the target application based on the current position of the mobile terminal, the initial position of the target application, the second moving direction and the second moving distance of the mobile terminal.

* * * * *